(12) United States Patent
Gürocak et al.

(10) Patent No.: US 12,397,513 B2
(45) Date of Patent: Aug. 26, 2025

(54) METHOD FOR JOINING FIBER-REINFORCED PLASTIC COMPONENTS AND STABILIZING DEVICE

(71) Applicant: FACC AG, Ried im Innkreis (AT)

(72) Inventors: Maximilian Gürocak, Passau (DE); Christoph Etzl, Andorf (AT); Markus Lang, Pattigham (AT)

(73) Assignee: FACC AG, Ried im Innkreis (AT)

( * ) Notice: Subject to any disclaimer, the term of this patent is extended or adjusted under 35 U.S.C. 154(b) by 120 days.

(21) Appl. No.: 18/564,592

(22) PCT Filed: May 27, 2022

(86) PCT No.: PCT/AT2022/060182
§ 371 (c)(1),
(2) Date: Nov. 27, 2023

(87) PCT Pub. No.: WO2022/246490
PCT Pub. Date: Dec. 1, 2022

(65) Prior Publication Data
US 2024/0239058 A1    Jul. 18, 2024

(30) Foreign Application Priority Data
May 27, 2021   (AT) .............................. A 50423/2021

(51) Int. Cl.
*B29C 70/44*   (2006.01)
*B29C 33/50*   (2006.01)
(Continued)

(52) U.S. Cl.
CPC ............ *B29C 70/44* (2013.01); *B29C 33/505* (2013.01); *B29C 65/70* (2013.01); *B29K 2995/0015* (2013.01); *B29L 2031/3076* (2013.01)

(58) Field of Classification Search
None
See application file for complete search history.

(56) References Cited

U.S. PATENT DOCUMENTS 5,366,684 A   11/1994   Corneau, Jr.
5,710,414 A   1/1998    Matsen et al.
(Continued)

FOREIGN PATENT DOCUMENTS

DE   102019111226 A1   11/2020
EP      1070661 A2     1/2001
(Continued)

OTHER PUBLICATIONS

ISA European Patent Office, International Search Report Issued in Application No. PCT/AT2022/060182, Sep. 9, 2022, WIPO, 4 pages.

*Primary Examiner* — Christopher T Schatz
(74) *Attorney, Agent, or Firm* — McCoy Russell LLP

(57) ABSTRACT

The invention relates to a method for joining fiber-plastic composite (FPC) components, in particular aircraft FPC components, comprising the following steps: i) providing a first and a second FPC component, the first FPC component having a recess; ii) introducing a stabilizing device into the recess of the first FPC component, the stabilizing device having a basic body with a cavity, an opening and a pressing element, which pressing element has at least partially a higher flexibility than the base body; iii) filling the cavity with a fluid, so that the pressing element is pressed against a delimiting surface of the first FPC component, which delimits the recess; iv) connecting the first FPC component to the second FPC component by joining at a connecting point, wherein a pressure force, is exerted onto the connecting point by means of the pressing element for stabilizing the form of the recess.

16 Claims, 5 Drawing Sheets

(51) Int. Cl.
  *B29C 65/70* (2006.01)
  *B29L 31/30* (2006.01)

(56) References Cited

U.S. PATENT DOCUMENTS

| | | |
|---|---|---|
| 2005/0035115 A1 | 2/2005 | Anderson et al. |
| 2017/0036310 A1 | 2/2017 | Matsen et al. |
| 2019/0275747 A1 | 9/2019 | Deruelle |

FOREIGN PATENT DOCUMENTS

| | | |
|---|---|---|
| EP | 3711933 A1 | 9/2020 |
| WO | 2016023056 A1 | 2/2016 |
| WO | 2019094428 A2 | 5/2019 |

METHOD FOR JOINING FIBER-REINFORCED PLASTIC COMPONENTS AND STABILIZING DEVICE

CROSS REFERENCE TO RELATED APPLICATIONS

The present application is a U.S. National Phase of International Application No. PCT/AT 2022/060182 entitled "METHOD FOR JOINING FIBER-PLASTIC COMPOSITE COMPONENTS, AND STABILIZING DEVICE," and filed on May 27, 2022. International Application No. PCT/AT 2022/060182 claims priority to Austrian Patent Application No. A 50423/2021 filed on May 27, 2021. The entire contents of each of the above-listed applications are hereby incorporated by reference for all purposes.

TECHNICAL FIELD

The invention relates to a method for joining fibre-reinforced plastic (FRP) components, in particular aircraft components, and to a method for producing an aircraft part, for example a control surface element. Furthermore, the invention relates to a stabilising device, which, in particular during a joining process, is insertable into a recess of an FRP component in order to retain its shape and/or shape it. In addition, the invention relates to a tool with such a stabilising device.

BACKGROUND AND SUMMARY

Components made of fibre-reinforced plastic material (FRP material) are often used in the aviation industry because they have high stability and low weight. In the production of aircraft parts, such as, for example, a control surface element, a plurality of components made of FRP material, hereinafter also referred to as FRP components, are often connected to one another by joining, such as, for example, by welding. However, during the welding of FRP components, undesirable deformations of the FRP components can occur due to the heat induced and the pressure applied. This can lead to problems, especially with reinforcing structures with hollow profiles, because they collapse in the absence of counterpressure during the welding process and can thus lose their shape and, therefore, their reinforcing effect.

It is known from the state of the art to insert an inflatable or liquid-fillable bladder made of silicone rubber into cavities of components made of FRP material in order to strengthen them during a welding process. Such a method is known from U.S. Pat. No. 5,710,414 A. The disadvantage is that the flexible bladder exerts uniform pressure on the surrounding component in all directions. The component can therefore also be deformed in an undesirable way, because the bladder also exerts pressure forces on points that do not experience any counterpressure as a result of welding. If heat from the welding process reaches these points, they are softened and deformed by the bladder under pressure. Furthermore, the bladder can only be placed in a targeted manner in narrow cavities with difficulty due to its flexibility. Furthermore, it can also tear and, in hot spots, melt and burst.

Devices and methods for machining and stabilising components during production are known from US 2019/0275747 A1, EP 3 711 933 A1, US 2017/0036310 A1, U.S. Pat. No. 5,366,684 A and US 2005/0035115 A1.

In the light of these statements, it is therefore the object of the present invention to at least partially alleviate the drawbacks of the state of the art. The object of the invention is, preferably, to provide a method and a stabilising device of the type mentioned at the beginning, with which a targeted and shape-maintaining stabilisation of an FRP component during joining, in particular during a welding process, is made possible. The stabilising device should be easily and precisely insertable into cavities.

This object is initially achieved by a method according to claim 1. According to the invention, the method comprises the following steps:
  i) providing a first and a second FRP component, the first FRP component having a recess;
  ii) inserting a stabilising device into the recess of the first FRP component, wherein the stabilising device has a preferably elongated base body with a cavity, an opening and a pressing element, which has, at least partially, a higher flexibility than the base body;
  iii) filling the cavity with a fluid such that the pressing element is pressed against a delimiting surface of the first FRP component, which delimits the recess;
  iv) connecting the first FRP component to the second FRP component by joining at a connecting point, wherein a pressure force, which is directed towards the outside, is exerted onto the connecting point by means of the pressing element for stabilising the shape of the recess.

Advantageously, with the pressing element, a pressure force can be exerted in a targeted manner on the connecting point, which is, for example, a welding point, and thus the shape of the recess and thus of the first FRP component is retained during the joining, in particular welding. Viewed from the base body, the pressing element is pressed outwards against the delimiting surface on the inside of the first FRP component and thus against the connecting point, while the shape of the base body is substantially retained. This is due to the fact that the pressing element is designed to be more flexible than the base body, i.e. has a lower stiffness. The base body thus substantially retains its shape, while the pressing element exerts the pressure force on the delimiting surface on the inside of the first FRP component, on the outside of which the connecting point is located. The pressure force is thereby directed outward (as viewed from a centre of the stabilising device). Thus, the stabilising device exerts a pressure force on the first FRP component. Due to the higher flexibility, the pressing element can be deflected relative to the base body. The pressing element is preferably elastically deformable. Advantageously, this also compensates for tolerances in the event of component faults. The flexibility of the pressing element can be achieved, in particular, in that the pressing element at least partially has a material that is more flexible, i.e. less stiff, than the material of the base body. It can also be provided that the pressing element and the base body consist of the same material or a similarly stiff material, but that the pressing element has a joint or has a thinner wall thickness than the base body. Due to a correspondingly thin wall thickness, sufficient flexibility of the pressing element can be achieved even with inherently hard and stiff materials. While the pressing element is pressed against the delimiting surface on the first FRP component, the shape of the base body changes only slightly at most. In contrast, in the state of the art, such as in U.S. Pat. No. 5,710,414 A, the pressure force of the stabilising device is uniformly delivered in all directions, so that the hollow profile can be deformed in an undesirable manner. The first and second FRP components consist, at least partially, preferably completely, of a fibre-reinforced plastic material. In this disclosure, a material consisting of reinforcing fibres and a plastic matrix is referred to as a fibre-reinforced plastic material (FRP material). Examples of FRP materials from which the FRP components can consist partially or completely are carbon-fibre-reinforced plastic (CFRP) or glass-fibre-reinforced plastic (GFRP). The first FRP component and the second FRP component may be, for example, components of a control surface element to be generated for an aircraft, for example a spoiler or a droop panel. According to the invention, the stabilising device is inserted into a recess of the first FRP component. The first FRP component may have a reinforcing structure with one or more hollow profiles, wherein the recess is formed by the hollow profile or one of the hollow profiles. The hollow profiles and thus the recess can be undercut or not undercut. The recess may be, for example, a hole, a cavity, or a curvature of the first FRP component. Since reinforcing structures are often used in components for aircraft (see, for example, WO 2016/023056 A1 as an example of a reinforcing structure), it is favourable if the base body has an elongated shape in order to support entire regions of such structures during joining and in order to facilitate insertion. According to the invention, the base body has a cavity which can be filled with a liquid and/or gaseous fluid. The cavity is preferably located inside the base body. The fluid may be, for example, air, water, or oil. Furthermore, the stabilising device has an opening, which is preferably arranged on the base body. Through the opening, the fluid can transmit the pressure force to the delimiting surface and thus to the connecting point in the inserted state of the stabilising device. The opening connects the cavity to the exterior of the stabilising device and may be free, i.e., uncovered, in one embodiment. Alternatively, the opening may be covered, for example, by a preferably flexible wall structure or by a film element. The only important thing is that the pressure force can be transmitted from the fluid through the opening to the outside. By filling the cavity with the fluid, the pressing element is pressed against the delimiting surface on the inside of the first FRP component and thus against the connecting point, since the pressing element has a higher flexibility than the base body. As already stated, the shape of the base body is thus substantially retained, while the pressing element is at least partially deformed and pressed against the delimiting surface. The material of which the pressing element consists at least partially may be, for example, a film material or a rubber-like material. While the pressing element presses against the delimiting surface and thus against the connecting point, the first FRP component and the second FRP component can be welded to one another. Advantageously, the pressure force generated by the stabilising device on the connecting point prevents a change in shape of the recess or of the first FRP component during the joining. The first and the second FRP component are preferably joined by welding. For example, an induction welding process, an ultrasonic welding process, a resistance welding process, a conduction welding process or a laser welding process is used to weld the first FRP component to the second FRP component. When using a welding process for joining, the connecting point can also be referred to as a welding point. The pressure force generated by the stabilising device acts as a counterpressure for the pressure applied during welding and counteracts the simultaneously softening material, which softens under the action of temperature. The shape of the recess, and thus of the first FRP component, is stabilised or consolidated by the counterpressure. In a preferred embodiment, the pressure force of the pressing element is directed substantially only in one spatial direction. It is particularly advantageous in most applications if, in the intended state of use of the stabilising device, the pressure force acts substantially only upwards in relation to an inertial system. As a result, the recess of the first FRP component is supported from below. Thus, the second FRP component can be welded to the first FRP component from above without changing the shape of the first FRP component.

The present method is thus suitable for stabilising an FRP component during a joining process for connecting two FRP components. The joining can be carried out, for example, by welding, screwing, riveting or gluing.

In a particularly preferred embodiment, it is provided that the pressing element has a bag which is arranged inside the cavity and is filled with the fluid in order to generate the pressure force, wherein the bag passes at least partially through the opening in the filled state and generates the pressure force on the connecting point. The bag may consist of a rubber material or a plastic material, for example. Preferably, the bag extends substantially over the entire length of the cavity. In a particularly preferred embodiment, the bag can be a tubular film which is closed at one end and is connected at the other end to a fluid supply, in particular a gas supply. When the bag is filled with the fluid (filled state), the bag is pressed through the opening because of its lower flexibility compared to the base body. In the filled state, the bag preferably fills substantially the entire cavity of the base body. The bag is thus so flexible that it substantially adapts to the shape of the cavity when filled.

A variant of the invention that is particularly easy to configure, and thus advantageous, results if a gas, in particular air, is used as the fluid. The gas can be filled into the cavity or bag by a compressor or pump. However, as already mentioned, the fluid may also be formed of a liquid, for example an oil or water.

For stabilising the recess and thus the first FRP component, it is advantageous if the fluid is pressurised to generate the pressure force and the pressure is between 1.0 bar and 8.0 bar, preferably between 1.5 bar and 5.0 bar, in particular between 2.0 bar and 3.0 bar. By means of such a pressure of the fluid, the forces during joining, in particular welding, can be effectively counteracted. At higher pressure forces, the recess and thus the first FRP component could be disadvantageously deformed by the stabilising device. Too low pressure forces (for example, depending on the component, below 1 bar) would have an insufficient stabilising effect.

In particular, if the joining of the FRP components takes place by welding, it is advantageous if the pressing element has a heat-insulating element, in particular a heat-insulating plate, which is pressed against the delimiting surface during the joining, in particular welding. The heat-insulating element prevents the heat input for welding from being dissipated too quickly. As a result, the welding process can be facilitated. In addition, the input heat is prevented from being distributed away from the welding point in the first FRP component, which contributes to the further stabilisation of the first FRP component. The heat-insulating element can be loosely arranged on the outside of the base body, for example. The heat-insulating element can alternatively be connected to the bag described above. In another embodiment, the heat-insulating element may be connected to the base body, for example via a film element or a rubber element. Preferably, the heat-insulating element consists of ceramic or of a polymer material, an FRP material, or fibre cement, or of a mixture of these materials. In a particularly preferred embodiment, the heat-insulating element is, in particular, a planar heat-insulating plate.

In one embodiment of the invention, it is provided that the first FRP component has a reinforcing structure and the recess is formed at least partially by a section of the reinforcing structure. Reinforcing structures are used in aircraft parts, in particular in control surface elements such as, for example, spoilers or droop panels, etc. In this embodiment, the recess is formed by a hollow profile of the reinforcing structure. A reinforcing structure may, for example, have one or more connecting flanges when viewed in cross section. The reinforcing structure may connect two surface elements to one another, for example. The connecting flange(s) may form a structural pattern, wherein a hollow profile is formed. The structural pattern may be triangular, trapezoidal, rectangular, or wavy, for example. The structure pattern may be present individually or may be repeated. In an exemplary structure pattern, for example, two substantially vertical connecting flanges are connected to one another via a horizontal connecting flange. This structure pattern can be present individually and thus form a single hollow profile. However, the structure pattern can also be repeated and form several hollow profiles.

In order to counteract any unintentional displacements of the FRP components, it is advantageous if at least the first FRP component is fixed during the joining process.

In one embodiment, it may be provided that the connecting point is cooled or heated by the fluid before joining, during joining, and/or after joining, preferably wherein the fluid is circulated. Cooling or heating a connecting point is particularly advantageous in a welding process for joining. The fluid may be liquid or gaseous. In a particularly preferred embodiment, it may be provided that the fluid is circulated between a temperature control device, in particular a cooling and/or heating device, and the cavity. As a result, heat energy is dissipated from or supplied to the first FRP component. The temperature control device may hold the fluid in a temperature range during circulation, for example.

The invention further relates to a method for producing an aircraft part, for example a control surface element, in particular a spoiler, comprising the steps of:
i) Arranging a first surface element of FRP material on a table;
ii) Placing an intermediate element having a reinforcing structure made of FRP material on the first surface element;
iii) Connecting the intermediate element to the first surface element by joining, in particular welding, at at least one connecting point, in order to obtain a first FRP component;
iv) Placing a second FRP component in the form of a second surface element on the first FRP component;
v) Connecting the first FRP component to the second FRP component by applying the method for joining fibre-reinforced plastic (FRP) components in one of the embodiment variants described above.

The control surface element may be a spoiler or a droop panel, for example. The first surface element can be, for example, an upper skin or lower skin of a spoiler. Corresponding to the first surface element, the second surface element may be the respective other of the upper or lower outer skin. When connecting the first surface element to the intermediate element, a stabilising device is typically not yet necessary, because the intermediate element rests on the first surface element and the connecting points are typically not located at any points with recesses underneath in step iii), so that no stabilisation by the stabilising device is necessary. However, if necessary, a stabilising device can already be used in this step and the above-described method of joining can be applied. In step iii), the connecting points, in particular welding points, are typically located at points at which the intermediate element rests directly on the first surface element, without recesses such as cavities lying below or in between. A change in shape by collapsing of recesses therefore typically does not take place in step iii). The first surface element only needs to be supported from below, for example by the table. Any stable base can be referred to as a table. In step v), however, at least one connecting point, in particular at least one welding point, is located at a point at which a recess is located thereunder, which is formed at least partially by the reinforcing structure of the first FRP component. In order to prevent a change in shape of the recess and thus of the first FRP component, the stabilising device is inserted into the recess and the above-described method of joining is applied.

After joining, in particular after welding, the first and second FRP components, the stabilising device can be removed from the recess, preferably after the fluid has been at least partially discharged from the cavity. The stabilising device can be reused.

The object mentioned at the beginning is also achieved by a stabilising device according to claim 9. The stabilising device can be inserted in particular during a joining process, in particular during a welding process, into a recess of a fibre-reinforced plastic (FRP) component to support it in a shape-retaining and/or shaping manner. The stabilising device according to the invention comprises:
  a preferably elongated base body with an internal cavity, which can be filled with a fluid,
  an opening, which is preferably arranged on the base body, and
  a movable pressing element for transmitting a pressure force, which is directed towards the outside to the FRP component, wherein the pressing element has at least partially a higher flexibility than the base body, wherein the pressure force can be generated by filling the cavity with the fluid.

With regard to the advantages and the design of the features of the stabilising device, reference is also made to the explanations in connection with the method described above. The cavity in the base body can be filled with a fluid, for example a gas, in particular air, or a liquid, in particular water or oil. When, as described above and below, the pressing element has a bag arranged in the cavity, it is filled with the fluid. Preferably, the base body is elongated in shape. The pressing element is movable relative to the base body. By filling the cavity (or optionally the bag in the cavity) with the fluid, the pressing element is pressed in the inserted state in the recess against the delimiting surface on the inside of the first FRP component. The shape of the base body is substantially retained. The pressure force of the fluid is transmitted to the FRP component via the opening. Due to the greater flexibility of the pressing element, it can be deflected relative to the base body. The pressing element is preferably elastically deformable. The flexibility of the pressing element can be achieved, for example, in that the pressing element at least partially comprises a material that is more flexible, i.e. less stiff, than the material of the base body. It can also be provided that the pressing element and the base body consist of the same material or a similarly stiff material, but that the pressing element has a joint or has a thinner wall thickness than the base body. A geometric solution is also possible, for example, by providing local reinforcement or weakening in the material. Due to a correspondingly thin wall thickness, sufficient flexibility of the pressing element can be achieved even with inherently hard and stiff materials. An example of this is aluminium: With a thick wall thickness, an aluminium base body makes it possible for the base body not to be deformed substantially under the pressure of the fluid. However, a thin aluminium plate as a pressing element can be deformed accordingly.

In a preferred embodiment, it is provided that the pressing element has a bag which is arranged within the cavity and which can be filled with the fluid in order to generate the pressure force, the bag protruding at least partially through the opening in the filled state in order to generate the pressure force on the component. The opening can be free, so that the bag can pass through unhindered. Alternatively, however, the opening may also be covered, for example by a film element, a rubber element or a flexible wall structure. The bag may be made of a plastic material or a rubber material. In a particularly preferred embodiment, the bag can be a tubular film which is closed at one end and is connected at the other end to a fluid supply, in particular a gas supply. In the filled state, the bag substantially fills the entire cavity and substantially adapts to its shape.

If the joining is carried out by welding the FRP components, it is advantageous, as already stated in connection with the method according to the invention, for the pressing element to have a heat-insulating element, in particular a heat-insulating plate, which is arranged on the outside of the base body, so that the pressure force is transmitted to the adjacent component via the heat-insulating element. Preferably, the heat-insulating element is designed as a flat, i.e. non-curved, plate.

In a preferred embodiment, the heat-insulating element consists of a ceramic material, a polymer material, an FRP material, a concrete material, a cement material, fibre-reinforced concrete or a mixture of said materials.

In one embodiment of the invention, the base body consists of a polymer material, an FRP material, a metal or a mixture of said materials.

For the stabilisation of recesses formed by hollow profiles, it is favourable if the base body is substantially U-shaped or substantially C-shaped in cross section. The cross-sectional shape of the base body can have a longitudinal flange, on the opposite longitudinal edges of which a first transverse flange and a second transverse flange protrude. The first transverse flange forms a first angle with the longitudinal flange. The second transverse flange forms a second angle with the longitudinal flange. The first and the second angle may be substantially 90°, for example. The first and/or the second angle can also be smaller than 90°, so that the cross-sectional shape of the base body tapers towards the free ends of the transverse flanges. It is also possible for the first and/or the second angle to be greater than 90°. The transverse flanges may also have mutually facing projections at the ends facing away from the longitudinal flange. One transverse flange may be higher than the other transverse flange. Preferably, the cross-sectional shape of the base body is substantially the same over the entire length. The opening of the stabilising device on the base body can be formed by an open end of the C or the U. If transverse flanges with projections are provided, the opening may be formed between the projections. The projections can also be designed in such a way that they each taper in cross-section toward the opening. As a result, the pressure force can be more effectively transmitted to the connecting point, particularly if a bag is provided.

Since reinforcing structures in aircraft parts such as spoilers often taper towards one side, it is advantageous if the cross-sectional shape of the base body also tapers towards the opening. If the cross-section is substantially C- or U-shaped and the opening is formed by the open end of the C or U, the cross-sectional shape of the base body tapers toward the open end of the C or U.

The stabilising device may form part of a tool for joining fibre-reinforced plastic (FRP) components. Such a tool may have:
    a table, preferably having a holding device for fixing an FRP component;
    a joining device, in particular a welding device;
    a stabilising device in one of the embodiment variants described above.

FRP materials can be connected to one another, in particular welded, with the joining device. In particular, the welding device may be embodied as an induction welding device. Alternatively, the welding device may be, for example, an ultrasonic welding device, a resistance welding device, a conduction welding device, or a laser welding device. The joining device can be arranged on a robot, in particular on a robot arm.

This disclosure also relates to the combination of the tool as described above with the first and the second FRP components as described above.

In the following, the invention will be explained in more detail with reference to figures, to which, however, it shall not be limited.

BRIEF DESCRIPTION OF THE FIGURES

In which.

DETAILED DESCRIPTION

Figure 1:
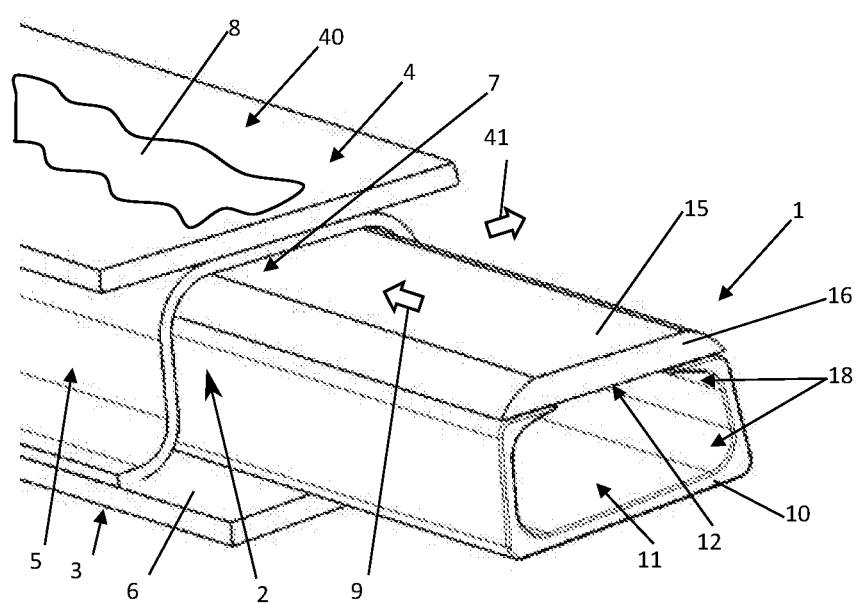
FIG. 1 shows a stabilising device according to the invention, which is partially inserted into a recess of a first FRP component.

FIG. 1 shows a stabilising device 1 according to the invention, which is only partially inserted into a recess 2 of a first FRP component 3 (FRP: Fibre-reinforced plastic). A second FRP component 4 is attached to, but not yet connected to, the first FRP component 3. Of course, the first FRP component 3 and the second FRP component 4 can also represent larger components with a plurality of recesses 2, for example components for aircraft parts 20 such as control surface elements. An example of a control surface element is a spoiler 21 (see FIG. 7).

In the illustration shown, the first FRP component 3 has a reinforcing structure 5 with a hollow profile 7 in the form of an inverted U, which is connected to a first surface element 6. The recess 2 is formed by the hollow profile 7. In FIG. 1, only a single recess 2 is shown; however, an FRP component may, of course, have a plurality of recesses 2 and thus a larger extent than shown in FIG. 1 (see, for example, FIG. 7). For example, the reinforcing structure 5 can have a structure pattern that is continued in the same way in the direction of the arrow 41, so that there are a plurality of similar hollow profiles 7 with recesses 2. In the illustration shown, the second FRP component 4 is formed by a second surface element 40.

In FIG. 1, the second FRP component 4 is attached to the first FRP component 3. The second FRP component 4 is to be connected to the first FRP component 3 at a connecting point 8 by joining. In the embodiments of the invention described below, the joining is performed by welding, for example, induction welding or ultrasonic welding. The connecting point 8 can therefore also be referred to as the welding point 8. In principle, however, the joining can also be carried out by screwing, gluing or riveting. The welding point 8 is indicated by the dotted line and is located on the outside of the recess 2 at the connecting point of the first FRP component 3 with the second FRP component 4. The welding point 8 is elongated and oriented approximately parallel to the recess 2.

In order to prevent the hollow profile 7 and thus also the recess 2 from being deformed by the induced heat and the applied pressure during the welding, according to the invention, prior to the welding, the stabilising device 1 is inserted into the recess 2 in the direction of the arrow 9, preferably substantially completely. In the embodiment shown, the stabilising device 1 comprises an elongated base body 10, in particular made of metal, which encloses a cavity 11 in the interior. In the embodiment shown, the stabilising device 1 has substantially the same cross-sectional shape as the recess 2. The size of the stabilising device 1 is adapted to the size of the recess 2.

Figure 2:
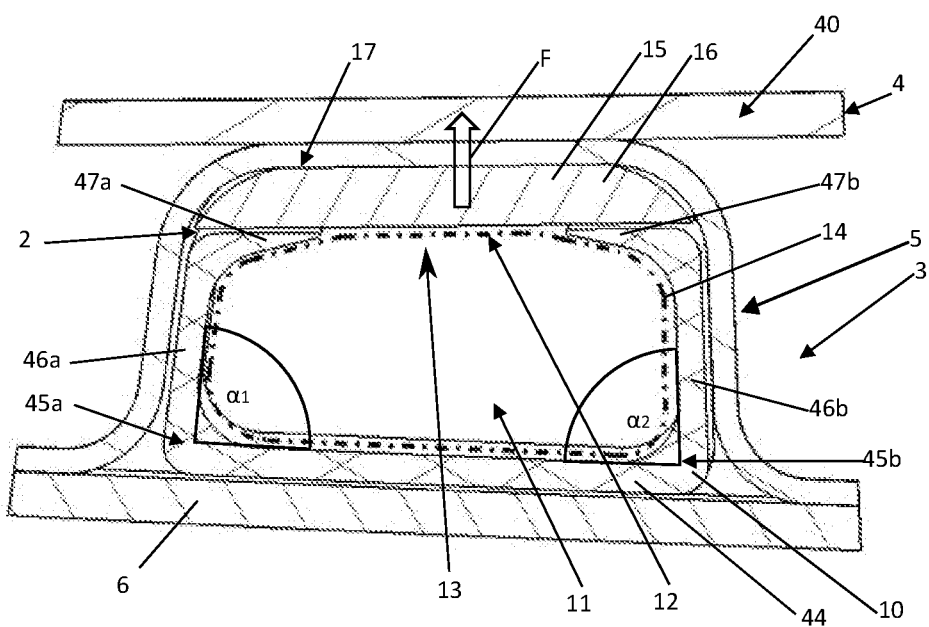
FIG. 2 shows a stabilising device according to the invention in a recess of a first FRP component in cross section.

FIG. 2 shows the stabilising device 1 in the recess 2 in cross section. As can be seen in FIG. 2, the base body 10 has a substantially C-shaped cross-sectional shape that tapers upward. In the embodiment shown, the cross-sectional shape of the base body 10 has a longitudinal flange 44, on the opposite longitudinal edges 45*a, b* of which a first transverse flange 46*a* and a second transverse flange 46*b* protrude. The first transverse flange 46*a* forms a first angle $\alpha_1$ with the longitudinal flange 44. The second transverse flange 46*b* forms a second angle $\alpha_2$ with the longitudinal flange 44. The angles $\alpha_{1,2}$ can be 90°, for example. At least one of the angles $\alpha_{1,2}$ (also both) can also be smaller than 90°, so that the cross-sectional shape of the base body 10, as in the embodiment shown, tapers upwards. It is also possible for at least one of the angles $\alpha_{1,2}$ (also both) to be greater than 90°. As shown, the transverse flanges 46*a, b* can also have mutually facing projections 47*a, b* at the ends facing away from the longitudinal flange. The one transverse flange 46 of the C-profile of the stabilising device 1 can be designed higher than the other transverse flange 46 of the C-profile. Preferably, the cross-sectional shape of the base body 10 is substantially the same over the entire length. On the top side of the base body 10, the stabilising device 1 also has an opening 12 between the transverse flanges 46, in particular between their projections 47*a, b*, which connects the cavity 11 to the surroundings. The projections 47*a, b* may taper toward the opening 12. As a result, the bag 14, which will be described in more detail below, can more easily pass through the opening 12. The stabilising device 1 further comprises a pressing element 13. In the embodiment shown, the pressing element 13 consists, at least partially, of a material that has a higher flexibility, i.e. a lower stiffness, than the material of the base body 10. In the embodiment shown, the pressing element 13 has a bag 14 which is located inside the cavity 11 and which consists of a plastic material. Furthermore, the pressing element 13 has a heat-insulating element 15 made of ceramic in the form of a heat-insulating plate 16, which is arranged on the outside of the base body 10 above the opening 12 and can rest against the projections 47*a, b*. The heat-insulating element 15 protects the bag 14 from high heat input and also ensures that the heat is not transferred from the welding point 8 to other places during welding, so that the heat for welding is not lost. By filling the bag 14 with a fluid, preferably a gas, in particular air, the bag 14 expands in the cavity 11 and exerts a pressure force F via the heat-insulating element 15 on a delimiting surface 17 delimiting the recess 2 on the inside of the first FRP component 3. Due to the higher stiffness and thus lower flexibility of the base body 10 compared to the bag 14, the shape of the base body 10 remains substantially the same when the pressing element 13 exerts the pressure force F on the delimiting surface 17. In the filled state, the bag 14 protrudes at least partially through the opening 12. The pressure force F is thus transmitted via the opening 12. As a result, the pressure force F is directed onto the welding point 8 and its immediate surroundings, while the base body 10 hardly deforms and exerts no or only a slight pressure force on the delimiting surface 17. To generate the pressure force F, the fluid is pressurised between 1.0 and 8.0 bar. If the pressure were too high (for example, 15 bar), there would be a risk that the recess would be deformed by the stabilising device 1. If the pressure were too low (for example, below 1 bar), the pressure force F would be too low and the recess 2 could be deformed during welding. The opening 12 may additionally be covered with a film element, a rubber element or a flexible wall element (not shown).

When the pressing element 13 exerts a pressure force F on the delimiting surface 17 of the recess 2, the welding process can be started in order to connect the first FRP component 3 to the second FRP component 4. The pressure force F prevents the recess 2 or the hollow profile 7 from deforming during welding, for example by collapsing. The stabilising device 1 thus provides a counterpressure that counteracts the pressure exerted during welding, so that the hollow profile 7 cannot collapse.

Figure 3:
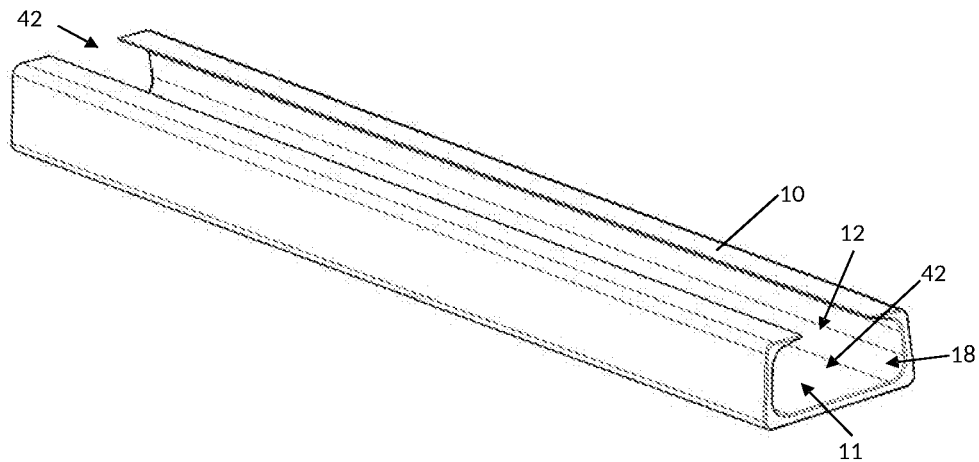
FIG. 3 shows a base body of a stabilising device according to the invention.

FIG. 3 shows an oblique view of the elongated base body 10 of the stabilising device. It can be seen that the cross section of the base body 10 is substantially C-shaped and tapers in the direction of the opening 12. The corners 18 of the inner surface of the base body 10 are rounded to prevent damage to the bag 14 in its filled state. The base body 10 may also have an insertion opening 42 on at least one of the two end faces. The bag 14 can be inserted into the cavity 11 and supplied with fluid through one of these insertion openings 42.

Figure 4:
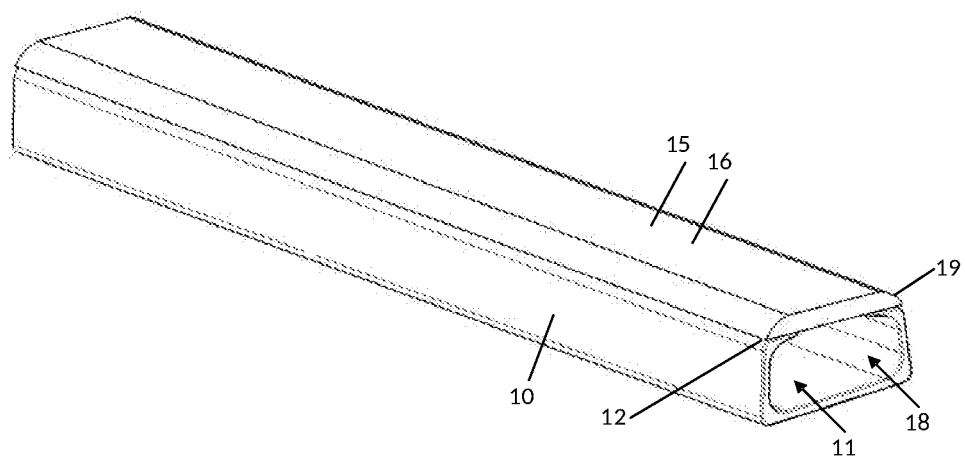
FIG. 4 shows a stabilising device according to the invention with a heat-insulating element.

FIG. 4 shows the base body 10 of the stabilising device 1 together with the heat-insulating element 15. It can be seen that the heat-insulating element 15 also has an elongated shape and is substantially trapezoidal in cross section, the legs 19 of the trapezoid having a curved or rounded shape.

Figure 5:
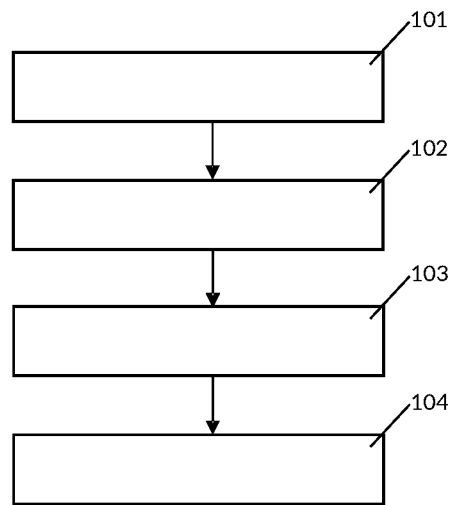
FIG. 5 shows a sequence of the method according to the invention for joining two FRP components.

FIG. 5 illustrates the sequence of the method according to the invention for joining, in particular welding, FRP components 3, 4. In step 101, the first 3 and the second FRP component 4 are provided. In step 102, the stabilising device 1 is inserted into a recess 2 of the first FRP component 3. In step 103, the cavity 11 or the bag 14 in the cavity is filled with the fluid, so that the pressing element 13 exerts a pressure force F on the connecting point 8. In step 104, the first FRP component 3 is connected, in particular welded, to the second FRP component 4. Subsequently, the stabilising device can be removed from the recess, preferably after the fluid has been at least partially discharged from the cavity 11. The stabilising device is reusable.

Figure 6:
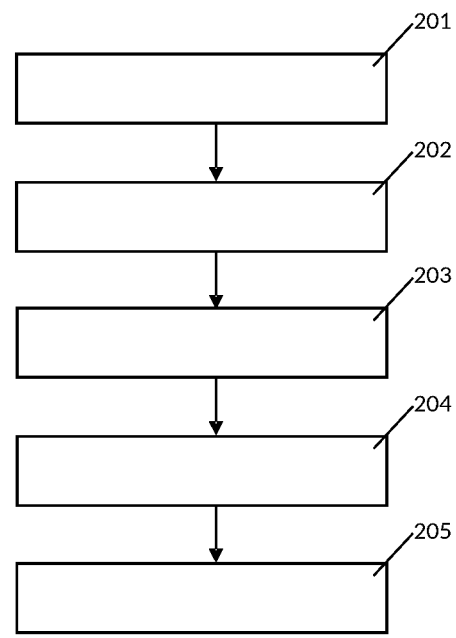
FIG. 6 shows a sequence of the method according to the invention for producing an aircraft part.
Figure 7:
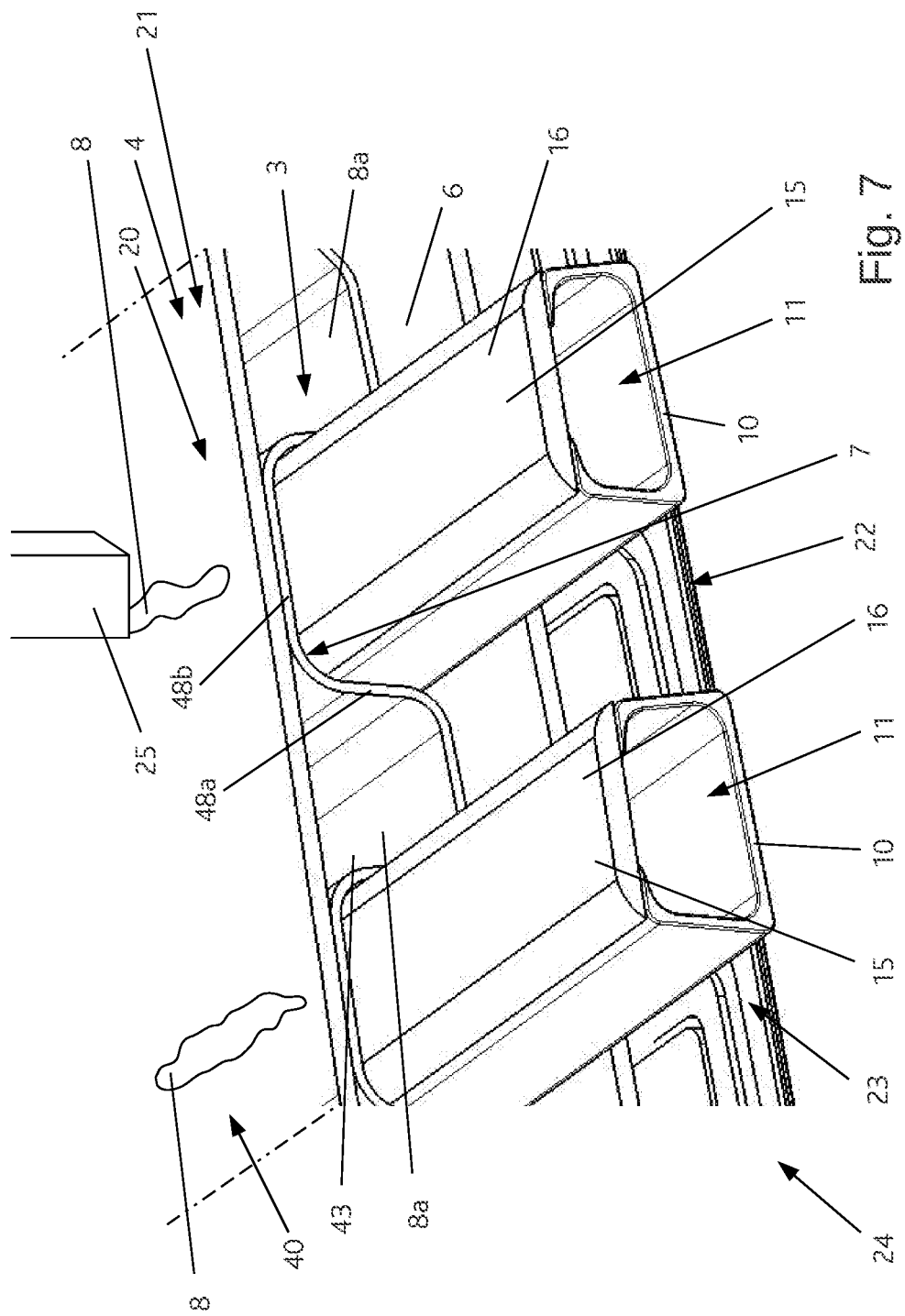
FIG. 7 shows a detail of an aircraft part during production.

The method can also be used in a method of producing an aircraft part 20, for example a control surface element such as a spoiler 21 (cf. also FIG. 7). In FIG. 6, the individual steps thereof are represented. In step 201, a first surface element 6 is arranged on a table 22. The table 22 may have a holding device 23 for fixing FRP components 3, 4. In step 202, an intermediate element 43 with a reinforcing structure 5 is placed on the first surface element 6 and subsequently joined, in particular welded, to the latter in step 203 at a connecting point 8a, preferably a welding point 8a. As a result, a first FRP component 3 is obtained. In a step 204, a second surface element 40, which forms a second FRP component 4, is placed on the first FRP component 3. Subsequently, in step 205, the second FRP component 4 is joined to the first FRP component 3 at the point 8 by joining, wherein the method of FIG. 5 is applied.

FIG. 7 shows a detail of an aircraft part 20 in the form of a spoiler 21 during production. In this case, two stabilising devices 1 are at least partially inserted into recesses 2 of a first FRP component 3. The first FRP component 3 has a reinforcing structure 5 as an intermediate element 43 and a first surface element 6. The reinforcing structure 5 forms hollow profiles 7. In the illustrated reinforcing structure 5, in each case two substantially vertical connecting flanges 48a are connected via a substantially horizontal connecting flange 48b. This structural pattern continues to form the reinforcing structure 5. A second FRP component 4 in the form of a second surface element 40 is placed on the first FRP component 3 and is to be connected thereto by welding at the welding points 8. The stabilising devices 1 stabilise the recesses 2 during welding as described above. The spoiler 21 is produced by means of a tool 24. The tool 24 comprises a table 22, preferably with a holding device 23, at least one stabilising device 1 and a joining device 25, preferably a welding device. This may, for example, be attached to an end effector of a robot (not shown).

The invention claimed is:

1. A method for joining fibre-reinforced plastic (FRP) components, comprising the following steps:
   i) Providing a first and a second FRP component, the first FRP component having a recess;
   ii) Inserting a stabilizing device into the recess of the first FRP component, wherein the stabilizing device has a preferably elongated base body with a cavity, an opening and a pressing element, said pressing element has, at least partially, a higher flexibility than the base body, wherein the pressing element has a bag which is arranged inside the cavity and can be filled with a fluid in order to generate a pressure force, wherein the bag in the filled state is configured to protrude at least partially through the opening in order to generate the pressure force on a delimiting surface of the first FRP component delimiting the recess, wherein the pressing element further has a heat-insulating element, which is arranged on the outside of the base body, such that the pressure force can be transmitted to the first FRP component via the heat-insulating element;
   iii) Filling the cavity with the fluid such that the pressing element is pressed against the delimiting surface of the first FRP component, which delimits the recess;
   iv) Connecting the first FRP component to the second FRP component by joining at a connecting point, wherein the pressure force, which is directed towards the outside, is exerted onto the connecting point by means of the pressing element for stabilizing the shape of the recess.

2. The method according to claim 1, wherein the bag is filled with the fluid in order to generate the pressure force, wherein the bag passes at least partially through the opening in the filled state and generates the pressure force on the connecting point.

3. The method according to claim 1, wherein a gas is used as the fluid.

4. The method according to claim 1, wherein the fluid for generating the pressure force is pressurised and the pressure is between 1.0 bar and 8.0 bar.

5. The method according to claim 1, wherein the heat-insulating element is pressed against the delimiting surface of the first FRP component during the joining.

6. The method according to claim 1, wherein the first FRP component has a reinforcing structure and the recess is formed at least partially by a section of the reinforcing structure.

7. The method according to claim 1, wherein at least the first FRP component is fixed during the joining.

8. The method according to claim 1, wherein the connecting point is cooled or heated by the fluid before joining, during joining, and/or after joining.

9. A method for producing an aircraft part, comprising the steps of:
   i) Arranging a first surface element of FRP material on a table;
   ii) Placing an intermediate element having a reinforcing structure of FRP material on the first surface element;
   iii) Connecting the intermediate element to the first surface element by joining, at at least one connecting point, in order to obtain a first FRP component having a recess; iv) Placing a second FRP component in the form of a second surface element on the first FRP component; v) Connecting the first FRP component to the second FRP component by applying the method according to steps (ii) through (iv) of claim 1.

10. A stabilizing device which can be inserted for the shape-retaining and/or shaping support of a fibre-reinforced plastic (FRP) component into a recess thereof, having:
    a base body with an internal cavity, which can be filled with a fluid,
    an opening, and
    a movable pressing element for transmitting a pressure force, which is directed towards the outside, to the FRP component, wherein the pressing element has at least partially a higher flexibility than the base body, wherein the pressure force can be generated by filling the cavity with the fluid, wherein the pressing element comprises a bag which is arranged inside the cavity and can be filled with the fluid in order to generate the pressure force, wherein the bag in the filled state is configured to protrude at least partially through the opening in order to generate the pressure force on a delimiting surface of the first FRP component delimiting the recess, wherein the pressing element further has a heat-insulating element, which is arranged on the outside of the base body, such that the pressure force can be transmitted to the first FRP component via the heat-insulating element.

11. The stabilizing device according to claim 10, wherein the heat-insulating element is a heat-insulating plate.

12. The stabilizing device according to claim 11, wherein the heat-insulating element consists of a ceramic material, a polymer material, an FRP material, a concrete material, a cement material, fibre-reinforced concrete or a mixture of said materials.

13. The stabilizing device according to claim 10, wherein the base body is made of a polymer material, an FRP material, a metal or a mixture of said materials.

14. The stabilizing device according to claim 10, wherein the base body is substantially U-shaped or substantially C-shaped in cross section.

15. The stabilising stabilizing device according to claim 10, wherein a cross-sectional shape of the base body tapers toward the opening.

16. A tool for joining fibre-reinforced plastic (FRP) components, comprising:
  a table,
  a joining device;
  a stabilizing device according to claim 10.

* * * * *